G. ATTERBURY.
PROCESS AND APPARATUS FOR MOLDING OR CASTING.
APPLICATION FILED MAY 18, 1908.
965,150.
Patented July 26, 1910.
3 SHEETS—SHEET 2.
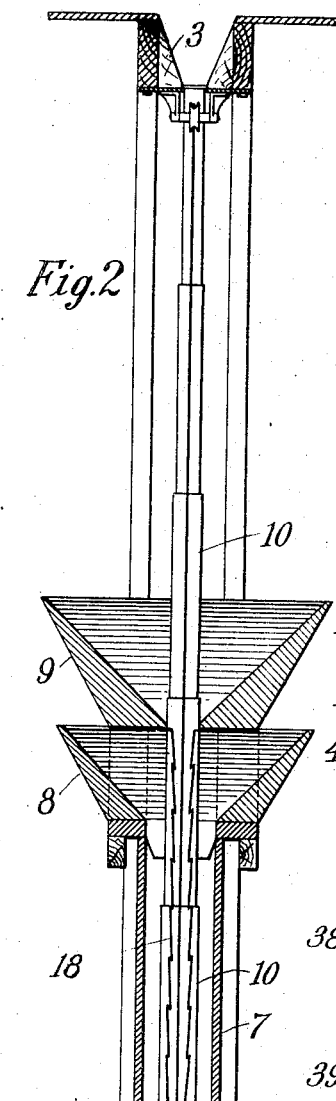
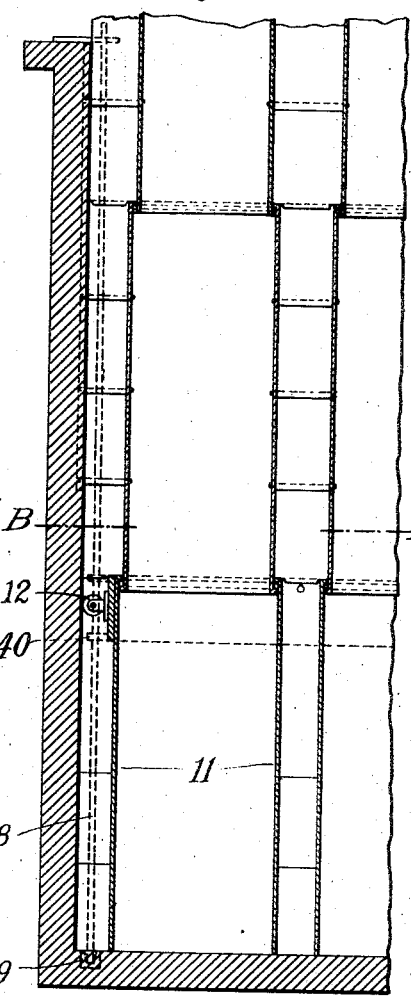
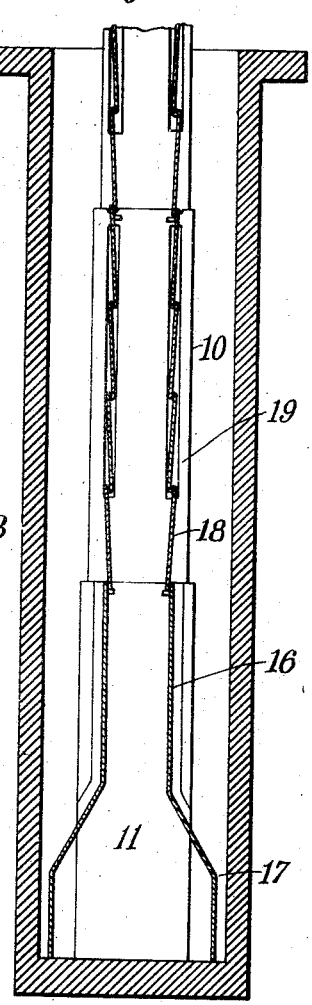
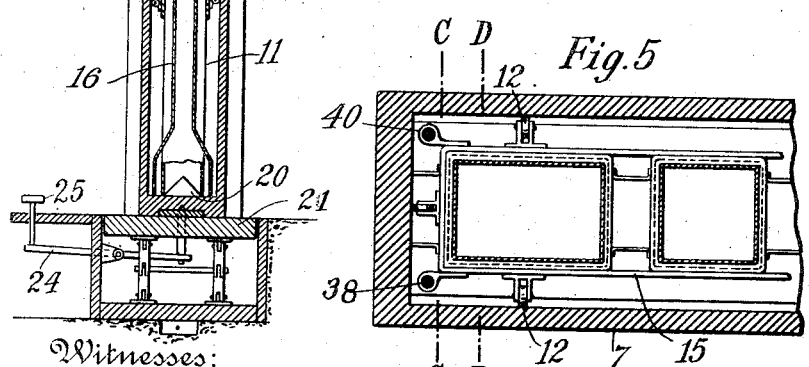
Inventor
Grosvenor Atterbury G. ATTERBURY.
PROCESS AND APPARATUS FOR MOLDING OR CASTING.
APPLICATION FILED MAY 18, 1908.
965,150.
Patented July 26, 1910.
3 SHEETS—SHEET 3.
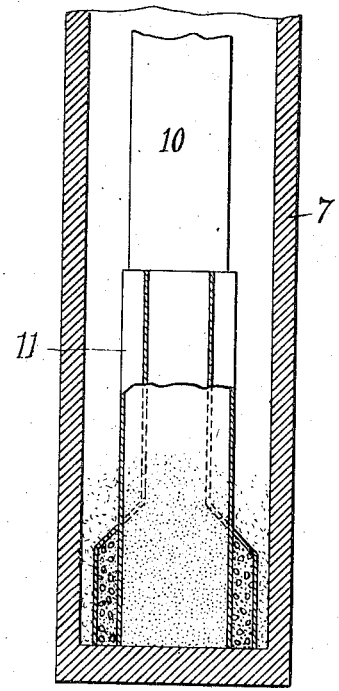
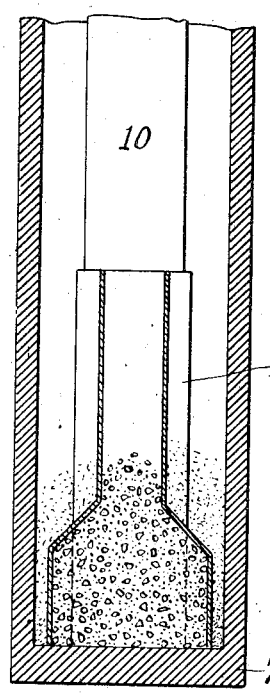
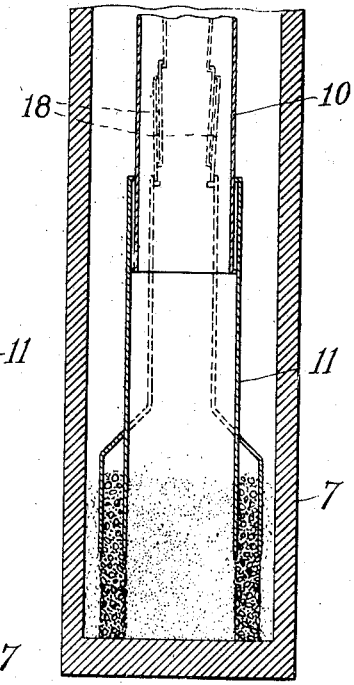
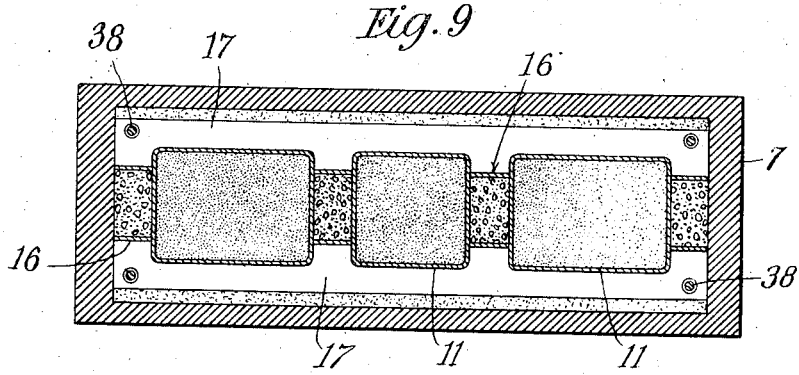

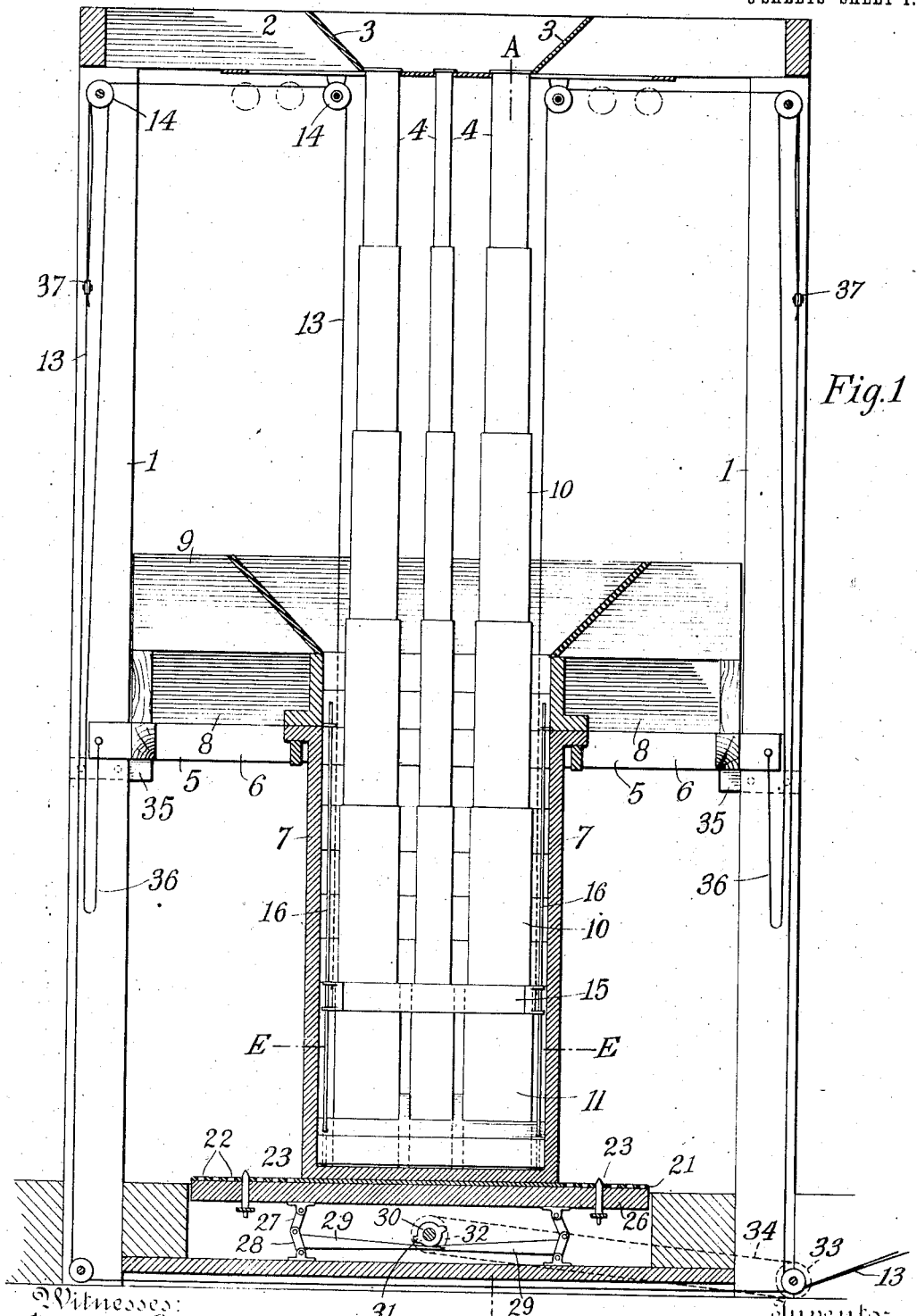

UNITED STATES PATENT OFFICE.

GROSVENOR ATTERBURY, OF NEW YORK, N. Y.

PROCESS AND APPARATUS FOR MOLDING OR CASTING.

965,150.  Specification of Letters Patent.  Patented July 26, 1910.

Application filed May 18, 1908. Serial No. 433,539.

*To all whom it may concern:*

Be it known that I, GROSVENOR ATTERBURY, a citizen of the United States, and a resident of the borough of Manhattan, city, county, and State of New York, have invented certain new and useful Improvements in Processes and Apparatus for Molding or Casting, of which the following is a full, clear, and complete disclosure.

My invention relates to that class of molding processes and apparatus in which a body or block is cast with central holes or openings, which holes or openings are formed by means of suitable cores, which are withdrawn while the material of which the block is cast is plastic, and its place taken by sand or other granular material, which maintains the plastic material in position after the withdrawal of the cores. Heretofore, in the operation of such machines or apparatus, difficulty has been encountered in the withdrawal of the cores, owing to the friction existing between the cores and the plastic material and with the granular material or sand inserted when the cores are withdrawn.

One object of my invention is to provide an apparatus and process which overcomes the difficulty above-mentioned, and by which bodies or blocks may be cast of any desired length continuously and in one operation.

A further object of my invention is to provide an apparatus and process in which bodies or blocks may be cast of several different materials, such as of concrete and of facing material for the blocks.

A further object of my invention is to provide an apparatus and process in which the plastic material used is compactly and homogeneously packed in position within the molds, thereby producing a firm and homogeneous body or block.

This invention is an improvement on my apparatus and process set forth in my prior Patent No. 828,833, issued August 14, 1906.

Briefly stated, my invention comprises the process of forming the blocks or bodies by feeding the materials of which the same are to be made, evenly and continuously during a definite period, sufficient to form a block of the length required, during the withdrawal of separating partitions or cores, and preferably at the same time, inserting the granular material or sand which holds the plastic material in position. Such feeding may be accomplished at approximately the same rate at which the plastic material or materials are inserted to form the block, or the granular material may be inserted partly or wholly beforehand. The feeding operation is carried on in conjunction with the operation of jarring or shaking the mold and the materials contained therein, so that such materials are firmly settled or packed in position.

Further features, advantages and objects of my invention will be apparent from the following specification and the accompanying drawings forming a part thereof, in which—

Figure 1 is an elevation of one form of apparatus for carrying out my improved process, and which I at present deem preferable, the mold or casing thereof and its supports being shown in vertical section; Fig. 2 is a vertical sectional view of the same taken substantially on the line A—A, Fig. 1; Figs. 3 and 4 are, respectively, longitudinal and transverse sectional views of the lower portion of the mold and the parts contained therein; Fig. 5 is a horizontal sectional view taken substantially on the line B—B, Fig. 3; Figs. 6 and 7 are vertical sectional views taken substantially on the lines C—C and D—D, respectively, of Fig. 5; Fig. 8 is a vertical sectional view taken substantially on the line C—C, Fig. 5, but showing the cores in a raised position; and Fig. 9 is a horizontal sectional view taken substantially on the line E—E, Fig. 1.

Referring to the drawings, the numeral 1 indicates vertical supports or beams forming a part of the frame for holding the cores and hoppers coöperating therewith in position. These are connected at their upper ends by horizontal beams 2, between which the hopper 3 is placed for feeding the sand to the partitions closed upon themselves forming central tubes or cores 4. The sides of the hopper 3 are preferably adjustable so as to be accommodated to cores of different numbers and widths. Between the upper and lower ends of the supports 1 is placed a horizontal platform or frame 5, composed of parallel beams 6, between which the upper end of the casing 7 of the mold is located and retained definitely in position. Upon the platform 5 are located one or more hoppers, 8 and 9, the hopper 8 being adapted to contain the material which is to be supplied to one part of the mold, such as the surfacing material, while the hopper 9 is adapted to contain other material, such as the main material or concrete, of which the blocks are composed.

The partitions that are closed upon themselves so as to form cores 4, for casting or forming the openings in the blocks or bodies being manufactured, preferably consist of a series of telescoping sections 10, the lower or outer section 11 of which is made according to the size and shape of the openings to be formed in the blocks. The section 11 is provided with suitable guide rollers 12, which contact with the inner surfaces of the casing 7 and retain the said section of the core accurately in position within the mold. To the section 11 of the core are attached suitable means for withdrawing the same, such as cables or cords 13, passing over pulleys 14 to any suitable source of power (not shown). The upper ends of the lower section 11 of the cores are preferably connected to a single head or frame 15, which holds said sections in their correct relative positions. The lower sections 11 of the cores 4 carry vertical divisional strips or plates 16, which are off-set at their lower ends as indicated at 17. These parts 16 and 17 form separators between the two kinds of material of which the block is to be formed, the off-set portion 17 being located relative to the inner surface of the casing so as to form a layer of the surfacing material of the requisite thickness on the outer surfaces of the block. The division plates or strips 16 are continued upward along and between the cores 4, preferably in the form of telescoping or overlapping sections 18, and form separating partitions from the bottom of the mold to the top of the mold adjacent their hoppers, so that the two materials may be inserted through the respective hoppers and will be maintained apart until they reach the lower end of the lower sections 11 of the cores. The overlapping sections 18 of the division plates will, therefore, slide upon each other as the lower section of the core is raised, and will, consequently, prevent the two materials from coming in contact with each other at all times. I may use other forms of dividing strips or partitions, such as flexible strips adapted to be rolled on a drum or roller like a curtain or shade roller. The separating strips 18 are guided in suitable grooves 19 in the surfaces of the adjacent core sections 10, and are thereby prevented from moving laterally. The bottom of the casing or mold 7 is provided with conical or pyramidal projections 20, which enter the lower ends of the sections 11 of the cores and center the same, so that the walls of the blocks or bodies being cast will be of uniform thickness at that point.

In view of the fact that it is desirable to have the lower end of the mold or casing 7 located accurately with regard to the upper end thereof, I provide means for fixing the same upon the movable base. These comprise a plate 21 fastened to the bottom of the mold, having ends projecting beyond the sides thereof. This plate is provided with series of holes 22, adapted to receive vertically movable pins 23. These pins are moved vertically by any suitable system of levers or other devices, such as indicated at 24 and 25. It will now be seen that when the mold is placed in position, two or more of the holes 22 may be caused to approximately register with the openings through which the pins 23 pass. The pins are then forced upward by pressure, as at 25, and this motion causes the pins to enter the corresponding holes in the plates, thereby accurately locating the plate 21 and the mold to which it is attached.

The base upon which the mold rests, as above mentioned, is vertically movable, and is given a jolting or shaking motion for settling or packing the materials within the mold into position. This may be accomplished by any suitable means, but I have illustrated, for example, the mechanism shown in Fig. 1. The base or platform 26 is mounted upon two or more pairs of jointed links 27 and 28. To the links 28 are attached levers 29, the inner ends of which rest upon a wheel or hub 30, provided with projecting pins 31, forming cams. The wheel 30 is mounted upon a suitable shaft, and is turned by any suitable mechanism, such as through the pulleys 32 and 33 and the belt 34. The platform 5 rests upon adjustable supports 35, which may be raised or lowered according to the length of the mold used. This platform is also connected with suitable cables or chains 36, the opposite ends of which are attached to the cables 13, as at 37. These lifting chains or cables 36 are of such a length that when the cores are at the bottom of the mold, at the beginning of the casting process, there is a considerable slack in the said cables, and the amount of this slack depends upon the distance which the lower end moves before the slack is taken up, as the connecting point 37 moves with the cable 13. Owing to this construction, it will be seen that by adjusting the length of the cables 36, the cores may be withdrawn during the casting process until their upper ends emerge from the top of the mold. At this point, the slack in the cables 36 being taken up, the frame 5 will then also move upward, and will carry with them the hoppers 7 and 8, supported on the beams 6, leaving the molds 7 disengaged from such parts and from the cores. The molds 7 may then be removed and an empty mold placed in position for the next casting operation.

The hoppers are all preferably adjustable to accommodate the different sizes of molds in which the different sizes and shapes of blocks are to be cast or molded.

If it is desired to reinforce the blocks with iron rods, such rods may be placed in the mold, as indicated at 38, their lower ends resting in sockets 39, formed in the mold, or on the bottom, or suspended so as to leave a space beneath their lower ends, and to hold the rods in position intermediate their ends during the casting process, I provide guides 40, attached to the section 11 of the cores. These guides are in the form of eyes, through which the rods pass, and it will be seen that if the ends of the core move upward, these guides will serve to accurately locate the rods within the cement, while the latter is being introduced, and at the same time serve to guide the cores. When the cores are completely withdrawn, the rod is allowed to remain in the cement or similar material, and thereby form reinforcing means. It is obvious that the rods may be located at any desired points in the block.

Having described this form of my improved apparatus, the process of casting the block is carried out as follows: The mold 7 having been placed in position upon the movable base 21, the cores 4 are lowered into the mold; sand, cement and facing material are then supplied respectively to the hoppers 3, 9 and 8, and preferably in such quantities that they will fill the respective portions of the mold into which they are introduced at a uniform rate, in other words, so that the facing material, the cement, and, also, if desired, the sand will always be at substantially the same height in the mold. When these materials have reached a certain height in the mold, say a foot, more or less, above the bottom of the lower section 11, the cores are moved upwardly, and this movement takes place at the same rate at which the mold is filled with the materials of which the block is being cast, and also, if desired, at the same rate that the sand is supplied. During the filling of the mold, the mechanism which causes the jolting or shaking of the platform 12 is also put in motion, thereby settling the cement firmly and homogeneously in position, preventing air holes and other weak spots, and also permitting the cores and partitions to be withdrawn more easily. It will be seen that as the lower section 11 of the cores 4 are withdrawn, only a portion of said section is surrounded by the plastic material and the sand, and since there is slight friction between said section of the core and these materials, there is no difficulty in lifting the cores, and the material quickly flows into the space previously occupied by the walls of the cores and the division plates and thereby prevents any space being left between the materials. It will also be seen that as the core is withdrawn, the sand remains in the space previously occupied by the core and preserves the shape of the hole or opening until the material has become set or hardened. When the material is completely set or hardened, the casing of the mold is removed from the block and the sand allowed to flow from the holes or openings, the casting process being then complete.

Having thus described this form of my invention, I do not wish to be understood as being limited to the exact arrangement of parts and details of construction set forth, for various changes may be made by those skilled in the art without departing from the spirit and scope of my invention.

What I claim and desire to protect by Letters Patent is:

1. The process of molding hollow bodies, comprising, progressively forming a body of plastic material, simultaneously shaping an opening in said accumulating body of plastic material, and simultaneously supplying and shaping granular material to fill and distend said opening immediately after the same is formed, said plastic material and granular material being supplied at the same rate as the progressive shaping of said opening and contacting with each other immediately after, and at the same rate as, said forming.

2. The process of molding hollow bodies, comprising progressively shaping openings in an accumulating body of plastic material, supplying granular material to said openings after the same are formed, and jarring or shaking said accumulating materials.

3. The process of molding cementitious and similar bodies, comprising, progressively forming vertically separated sections of plastic materials by supplying said materials constantly and at the same rate, and then causing said sections to progressively contact with each other immediately after, and at the same rate as, said forming.

4. The process of molding cementitious and similar bodies, comprising, progressively forming vertically separated sections of plastic material, by supplying said material constantly and at the same rate to each section, simultaneously shaping openings in said plastic material, supplying and forming granular material to fill and distend said openings immediately after the same are formed and then causing said sections and said granular material to progressively contact with one another immediately after, and at the same rate as, said forming.

5. The process of molding cementitious blocks, comprising, progressively and simultaneously forming a body of cementitious material and outside sections of a facing material by supplying said materials constantly and at the same rate, simultaneously shaping an opening in said cementitious material, supplying and forming granular material to fill and distend said opening immediately after the same is formed, and then causing said plastic material, said facing material and said granular material to progressively contact with one another immediately after, and at the same rate as, said forming.

6. An apparatus for molding cementitious bodies, comprising a suitable mold, vertically movable partitions within said mold, vertically disposed reinforcing guide-rods in said mold, and means connecting said rods and said vertically movable partitions, adapted to prevent lateral movement of the latter, substantially as described.

7. In an apparatus for molding cementitious bodies, a mold-box, a vertical core in said box, means for simultaneously supplying cementitious material around said core and granular material in said core and for gradually withdrawing said core from the box as the material is supplied, substantially as described.

8. An apparatus for molding cementitious bodies, comprising, a suitable mold, vertically movable partitions within said mold, means for raising said partitions at the rate at which the cementitious material is supplied and means for jarring said mold during the raising of said partitions.

9. An apparatus for molding cementitious bodies, comprising, a suitable mold, vertical telescoping cores within said mold, and means for raising the lower sections of said cores at the rate at which the cementitious material is supplied.

10. An apparatus for molding cementitious bodies, comprising, a suitable mold, tubular telescoping cores within said mold, means for raising the lower sections of said cores at the rate at which the cementitious material is supplied, and means for jarring said mold during the raising of said sections.

11. An apparatus for molding cementitious bodies, comprising, a suitable mold, vertical cores within said mold, means for supplying granular material to said cores, means for supplying cementitious material between said cores and said mold, and means for continuously and uniformly raising the lower ends of said cores at the rate at which said materials are supplied to said cores and mold.

12. An apparatus for molding cementitious bodies, comprising, a suitable mold, movable tubular cores within said mold, movable partitions within said mold and coöperating with said cores, means for supplying cementitious material at the sides of said partitions, means for supplying granular material to said cores, and means for raising the lower ends of said cores and said partitions at the rate at which said materials are supplied.

13. An apparatus for molding cementitious bodies, comprising, a suitable mold, movable telescoping partitions and cores within said mold, removable hoppers for supplying cementitious materials at the sides of said partitions, hoppers for supplying granular material to said cores, means for raising the lower sections of said partitions and cores at the rate at which said materials are supplied, and means coöperating with said last-named means for disengaging said hoppers and cores from the mold when the same is filled.

14. The process of forming hollow bodies in a casting mold which comprises pouring a mobile material into a hollow core, and pouring a plastic material around said core, and in withdrawing said core simultaneously with and at the same rate as the mobile material and plastic material are supplied to said mold.

15. The process of forming hollow bodies in a casting mold which comprises pouring a granular material into a hollow core, and pouring a plastic material around said core, and in withdrawing said core simultaneously with and at the same rate as the granular material and plastic material are supplied to said mold.

16. The process of molding bodies in a casting mold which comprises pouring a plastic material in the mold and on one side of a partition and pouring a plastic material of a different grade into the mold and on the other side of a partition, and in withdrawing said partition simultaneously with and at the same rate as the plastic materials are supplied to said mold.

17. In an apparatus for molding hollow plastic bodies comprising a suitable mold, a hollow core in said mold, means for supplying granular material into said core, means for supplying plastic material around said core, and means for raising said core at the same rate that the granular material is supplied into the core and the plastic material around said core.

Signed this 6th day of May, 1908.

GROSVENOR ATTERBURY.

Witnesses:
ALBERT E. WILSON,
CHARLES C. MAY.